Feb. 9, 1954 C. W. HARRISON 2,668,872

VERTICAL SYNCHRONIZING SYSTEM

Filed Aug. 10, 1951 3 Sheets-Sheet 1

INVENTOR
C. W. HARRISON
BY Hugh S. Wertz
ATTORNEY

Feb. 9, 1954 C. W. HARRISON 2,668,872

VERTICAL SYNCHRONIZING SYSTEM

Filed Aug. 10, 1951 3 Sheets-Sheet 2

INVENTOR
C. W. HARRISON
BY Hugh S. Wertz
ATTORNEY

INVENTOR
C. W. HARRISON
BY Hugh S. Wertz
ATTORNEY

Patented Feb. 9, 1954

2,668,872

UNITED STATES PATENT OFFICE 2,668,872

VERTICAL SYNCHRONIZING SYSTEM

Charles W. Harrison, Gillette, N. J., assignor to Bell Telephone Laboratories, Incorporated, New York, N. Y., a corporation of New York Application August 10, 1951, Serial No. 241,241

5 Claims. (Cl. 178—69.5)

This invention relates to synchronizing systems. More particularly it concerns synchronizing systems which make use of composite signals having different frequency components for transmission of the synchronizing information, as, for example, the standard RMA television synchronizing system which utilizes composite signals comprising relatively short horizontal or line synchronizing pulses interposed with relatively longer serrated vertical or field synchronizing pulses to control the vertical and horizontal sweep generators at the receiver to provide synchronization with the scanning process at the transmitter.

An object of this invention is to improve the synchronization in systems which use composite synchronizing signals.

It will be convenient for purposes of analysis to describe the present invention specifically with relation to a standard RMA television synchronizing system, but it will be evident that the invention is not necessarily limited thereto.

In a typical television system, the basic arrangement for separating the horizontal and vertical synchronizing signals from the composite synchronizing information includes a differentiating circuit to which the composite signal is supplied for separating out the shorter line synchronizing pulses and an integrating circuit to which the composite signal is supplied for separating out the longer field synchronizing pulses. For effecting this separation, the integrating circuit is characterized by steady leakage sufficient for eliminating the effect of the short horizontal synchronizing pulses but insufficient to prevent accumulation of charge during the longer vertical synchronizing pulses. Some point, usually about half the expected cumulative amplitude, is made the operating point for triggering the field sweep generator. The triggering time then coincides with the accumulation of the charge in the integrating circuit to this chosen operating amplitude.

However, this simple arrangement has for some time hithertofore been known to be not too well adapted for conventional interlaced scanning systems since interlacing results in non-uniformity between the even and odd-numbered fields of each television frame in the region of the vertical synchronizing pulse. This non-uniformity in turn leads to different triggering times as measured from the start of the field synchronizing pulse for the two successive fields and hence uneven and inaccurate interlacing. To minimize the difference in wave form in the region of the vertical synchronizing pulse for even and odd-numbered scanning fields, it is now the practice to insert equalizing pulses at half-line intervals, for a time before and after the field synchronizing pulses, so that in this region successive fields are made to be alike. Although this is, in general, satisfactory, for high fidelity receivers it is usually necessary to resort to still more sophisticated arrangements to obtain the desired degree of accuracy in timing. The present invention is concerned with this problem.

Accordingly, a more specific object of this invention is to facilitate and improve the separation of the component parts of a composite RMA synchronizing signal and thereby to increase the accuracy of interlacing.

In a copending joint application Serial No. 241,243, filed August 10, 1951, of R. E. Graham and C. W. Harrison, there is described a synchronizing separator in which the composite signal is applied to a low-pass filter and the output thereof is subtracted from the input composite signal to effect amplitude discrimination between the field and line synchronizing pulses, and thereafter, by clipping, there is isolated the vertical synchronizing information. The present invention relates to an improvement over this arrangement.

In accordance with a preferred embodiment of the present invention, the separation of the field synchronizing pulses is achieved by an arrangement in which: the composite signal is supplied simultaneously to a low-pass filter having a cutoff below the frequency of the line synchronizing pulses but above the frequency of the field synchronizing pulses and to means responsive to leading edges of all the pulses in the composite signal; the outputs of the filter and leading edge responsive means are added; and the resultant is applied to clipping means to provide a series of pulses which represents the vertical synchronizing information. These pulses can be used directly or after stretching for the synchronization of the vertical sweep generator.

The invention will be better understood by reference to the following more detailed description taken in connection with the accompanying drawings in which.

Figure 1:
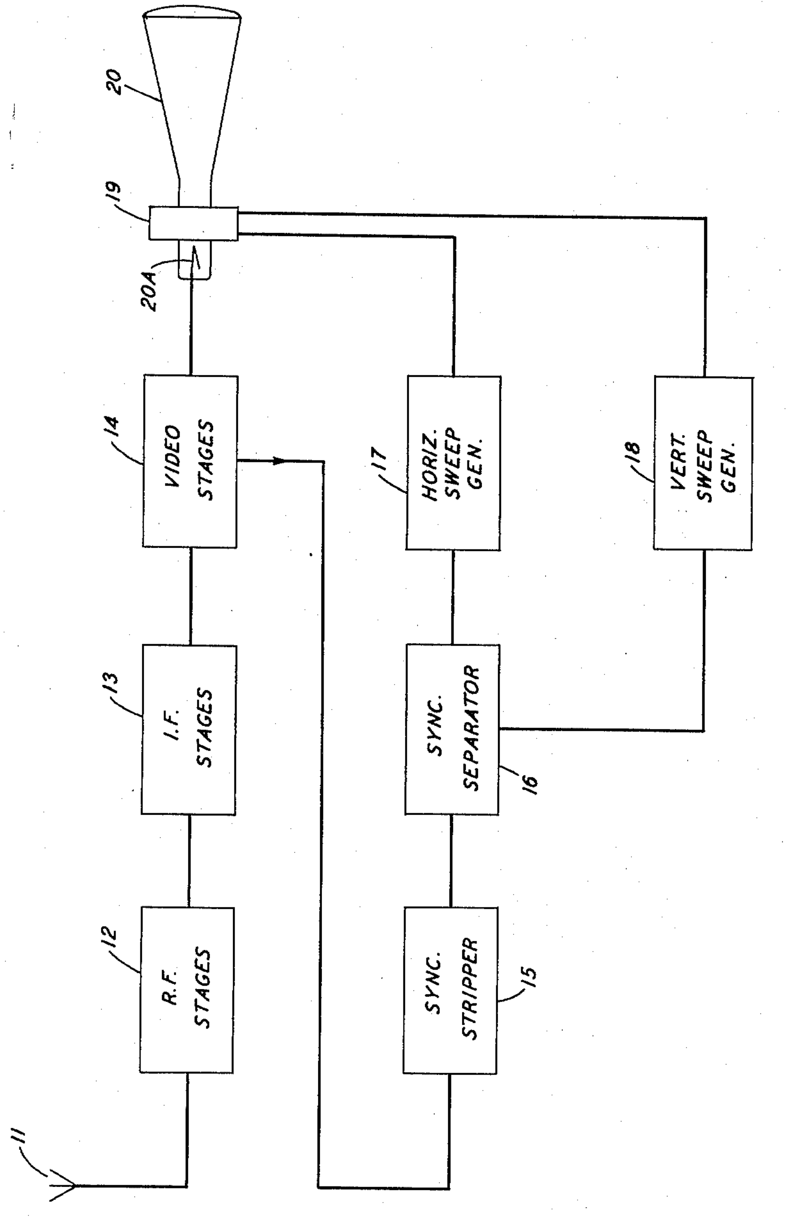
Fig. 1 shows, in block schematic form, the basic circuit elements of a television receiver.
Figure 4A:
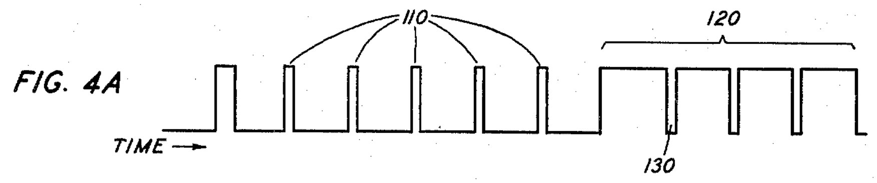
Figs. 4A through 4F illustrate wave forms to be referred to in the description of the invention.

Referring now more particularly to the drawings, in Fig. 1 there is shown the circuit of a typical television receiver. The transmitted radio frequency television signal is received by the antenna 11 and thereafter in the radio frequency stages 12 it is amplified and converted to an intermediate frequency. In the intermediate frequency stages 13, this intermediate frequency signal is amplified further, and the video signal is detected therefrom. In the video stages 14, this signal is again amplified. At this point the video signal includes both the picture and synchronizing information. Because it is usual to include the synchronizing information at amplitude levels which will not affect the picture on the viewing screen, the video signal can be applied directly to the intensity control element 20A of the viewing tube 20. However, for the recovery of the synchronizing information, it is first necessary to eliminate the picture signal, and so the video signal is applied to a synchronizing stripper 15 which removes the picture information and leaves only the synchronizing information. This synchronizing information is a composite signal which comprises a series of horizontal synchronizing pulses interspersed with a series of serrated vertical synchronizing pulses. The wave form of a portion of this composite signal is shown in Fig. 4A. This composite signal is thereafter applied to a synchronizing separator 16 which separates out the horizontal and vertical synchronizing pulses. These in turn are applied to the horizontal and vertical sweep generators, 17 and 18, respectively, for providing the deflecting sweep signals which are applied to corresponding deflecting means 19 of the viewing tube 20. The present invention is primarily concerned with improving the control of the sweep generators, more particularly the vertical sweep generator, and to this end provides an improved synchronizing separator arrangement which permits more accurate timing of the vertical sweep generator. The other components of the receiver may be of the kind found in the typical commercial receiver.

Figure 2:
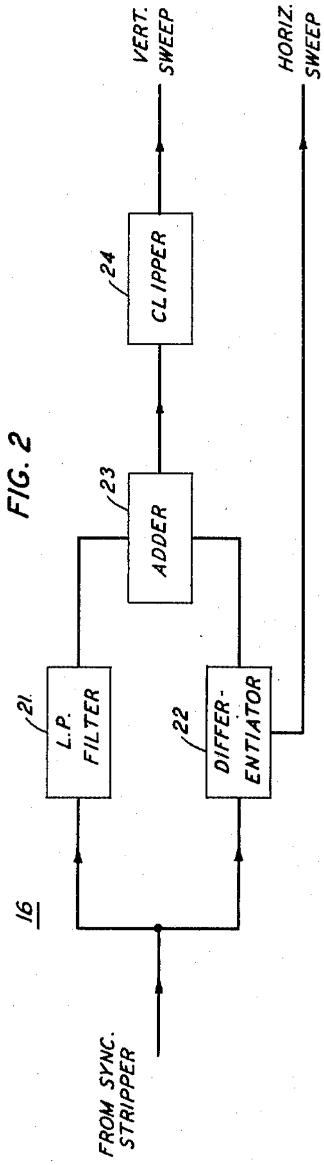
Fig. 2 shows, in block schematic form, an exemplary embodiment in accordance with the invention of a synchronizing separator suitable for use in the receiver shown in Fig. 1.
Figure 4B:
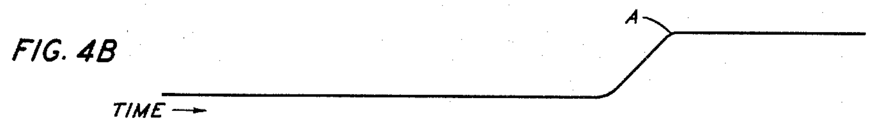
Figure 4C:
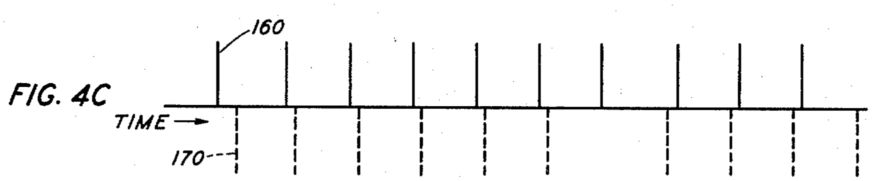
Figure 4D:
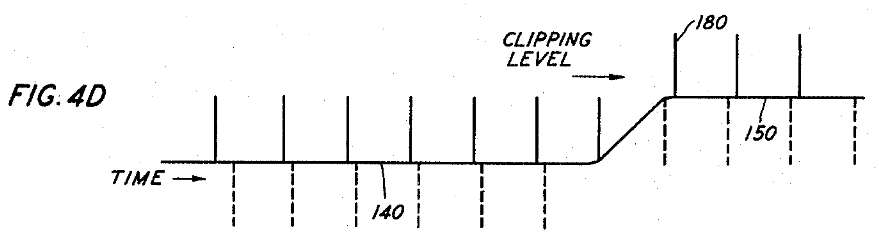
Figure 4E:
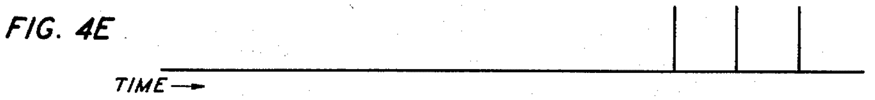
Figure 4F:
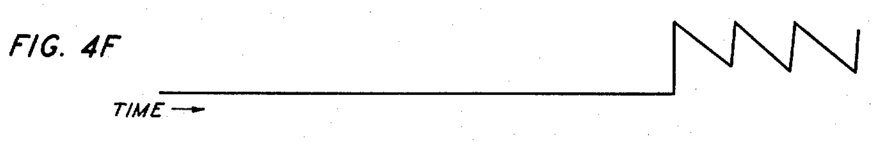

Fig. 2 shows in block schematic form a synchronizing generator 16 in accordance with the invention, which by way of example will be discussed specifically with reference to a standard RMA television system. The composite synchronizing signal which is derived from the synchronizing stripper shown in the receiver of Fig. 1 has in the region of a vertical synchronizing pulse the wave form shown in Fig. 4A. It can be seen that this wave comprises a series of short pulses 110 which comprise the line synchronizing pulses and equalizing pulses, and a longer pulse 120 having serrations 130 which forms the field or vertical synchronizing signal. This composite wave is applied simultaneously to both the low-pass filter 21 and means sensitive to leading edges of pulses applied thereto, such as a differentiating means 22. The low-pass filter 21 is designed to have a cut-off frequency below that of line frequency (15,725 cycles per second for an RMA signal) and above that of field frequency so that effectively the short line pulses are filtered out, while the longer field pulse is smoothed of its serrations. The resultant wave form is shown as curve A in Fig. 4B. It can be seen that curve A starts to rise in amplitude coincident with the start of vertical synchronizing pulse 120 and has attained an appreciable amplitude by the time of the first serration. The differentiating means 22, on the other hand, is equally sensitive to all abrupt changes in amplitude and provides a sharp positive pulse 160 coincident with each leading edge and a sharp negative pulse 170 coincident with each trailing edge of the composite wave, which results in a wave output as shown in Fig. 4C. When the outputs of the low-pass filter and the differentiating means are combined in the adder 23, there is derived therefrom a resultant having the wave form shown in Fig. 4D. This represents the addition of the waves shown in Figs. 4B and 4C. It can be seen that where the positive pulses 160 supplied by the differentiating means are superimposed on the wave A passed by the low-pass filter, there results sharp positive pulses 180 having an amplitude level considerably higher than in the other regions of the wave. It will be seen that each of these high amplitude pulses coincides with the leading edge of one of the components of the vertical synchronizing pulse, the first of these pulses occurring at the end of the first vertical pulse serration, which allows ample time for the return of the vertical sweep trace which has been at the opposite end of the screen. The output of the adder 23 is then applied to a clipping means 24 whose level is chosen to pass only amplitudes in excess of both the maximum amplitude of the filtered wave A and of the positive pulses 160 provided by the differentiating means. Consequently, as is shown in Fig. 4E, the output from the clipping means comprises a series of pulses 190 which coincide with the high amplitude pulses 180 supplied by the adder. Since the first of the pulses 190 occurs sharply and regularly at the leading edge following the first vertical pulse serration, precise vertical synchronization can be effected thus insuring good interlacing. It is characteristic of this arrangement that the use of differentiating means in place of conventional integrating means increases the accuracy of the timing. In instances where it may be preferable to control the vertical sweep generator with a relatively long flat pulse rather than the series of pulses 190, this series can be supplied to conventional pulse stretching means from which there can be derived a synchronizing signal whose wave form is of the kind shown in Fig. 4F.

It should also be evident that the filtered output can be combined alternatively in opposite sign with the negative pulses derived by differentiation, which pulses coincide with the trailing edges of the pulses of the composite input signal. Then, if the combined output is clipped as above, there can be derived a different series of pulses, equally suitable for triggering the vertical sweep generator. In this case, the first of the output pulses will occur at the leading edge of the first serration in the vertical synchronizing pulse, and so the start of the vertical synchronizing pulses is advanced by the width of the serration in the vertical synchronizing pulse. This difference is of little practical importance, however, so long as the triggering coincides regularly at this particular time.

Figure 3:
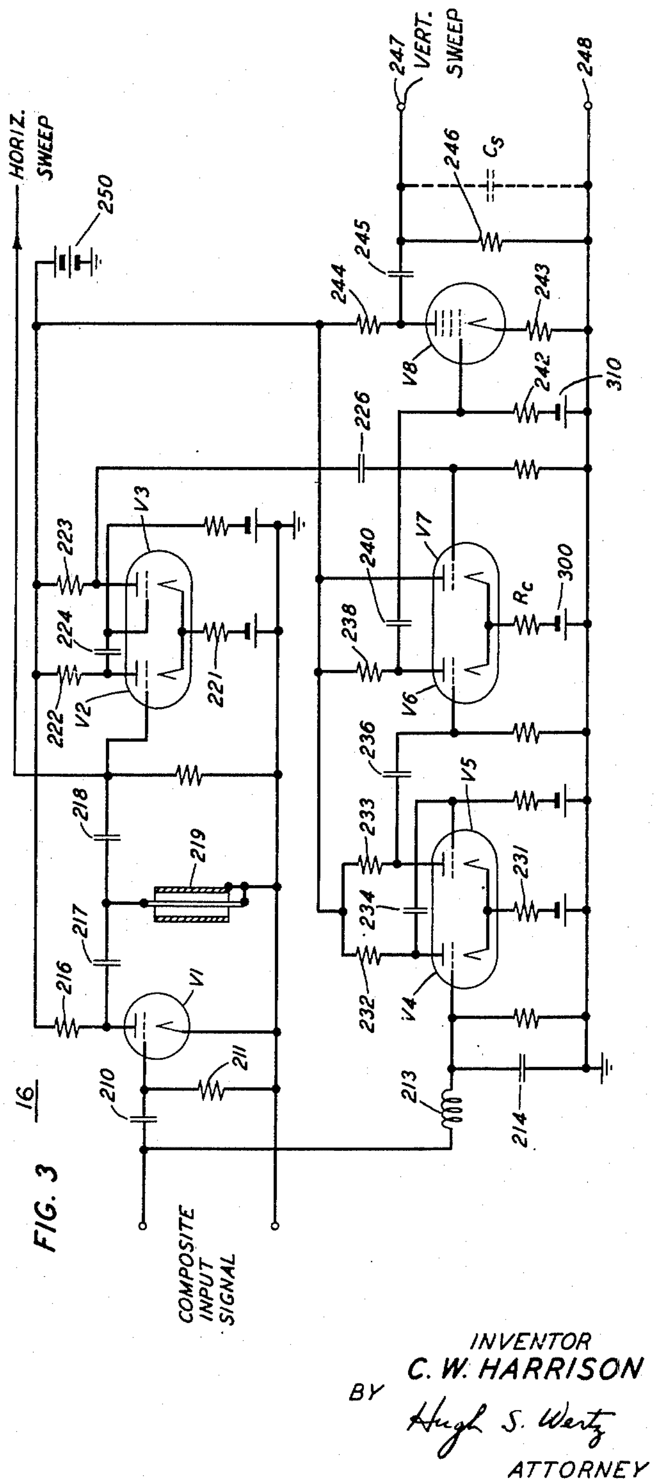
Fig. 3 shows diagrammatically an alternative embodiment of the invention.

Fig. 3 illustrates diagrammatically an exemplary circuit arrangement for a synchronizing separator in accordance with the invention, which uses a shorted delay line as the leading-edge sensitive means. The composite synchronizing signal of the wave form shown in Fig. 4A, which is supplied from the synchronizing stripper, is applied simultaneously both to the grid circuit of the amplifier stage V1 by way of the coupling capacitance 210 and grid leak resistor 211 and to the amplifier stage V4 by way of the low-pass filter comprising the inductance 213 and capacitance 214. (Actually, for use in the arrangement shown here, the input signal should be of reverse polarity with respect to that shown for the wave of Fig. 4A, so that there will result a series of positive output pulses at the plate of tube V1.) Amplifier V1 has its cathode connected to ground potential, and the plate voltage is derived by way of the plate load resistance 216 from the positive terminal of the potential source or battery 250, the negative terminal of which is at ground potential. The plate of tube V1 is connected by way of the series coupling capacitors 217 and 218 to the control grid of the stage V2. A short-circuited delay line 219 is connected from a point intermediate the coupling capacitors 217 and 218 to ground potential. For use with RMA synchronizing signals, a 1.0-microsecond shorted delay line has been found suitable. A signal appearing at the input of this line will be reflected from the shorted termination and reappear at the input as a signal 180 degrees out of phase with the input signal after an interval equal to the time it takes the signal to travel the length of the line and return. It can be seen that this effectively acts to short out any output signal derived at the plate of tube V1 except for the short interval it takes for the output to traverse the line. This serves as an equalizing means in the sense that a first series of positive pulses of relatively long and varying time intervals at the plate of tube V1 will provide a second series of positive pulses of equal shorter time intervals at the control grid of tube V2, in which the leading edge of each of the pulses of the second series of pulses will coincide with the leading edge of a corresponding pulse of the first series. Actually, there will also be provided a like third series of negative pulses corresponding to the trailing edges of the first series of pulses. It can be seen that there is effected by such equalizing means substantially the same results that would be obtained by differentiating the first series of pulses. By making the time interval of the delay line short, very sharp pulses may be derived by this arrangement. The tubes V2 and V3 are operated as an amplifier which is well limited and is responsive only to positive pulses applied at the control grid of the stage V2. Good limiting to a predetermined level is achieved by proper choice of the circuit components, the plate load resistances 222 and 223, the coupling capacitance 224, and the common cathode resistance 221. The output of this amplifier will have the series of pulses 160 shown in Fig. 4C. This signal is applied for addition by the coupling capacitance 226 to the control grid of tube V7 which forms part of an adding circuit. Returning again to the composite signal being applied to the low-pass filter comprising the inductance 213 and capacitance 214, the output therefrom will have the wave form shown in Fig. 4B. To provide amplification to this new signal before addition with the equalized series of pulses derived from the output of tube V3, this signal is applied to the control grid of the tube V4. The stages V4 and V5 form a two-stage amplifier which provides good limiting, achieved as before by appropriate choice of the values of circuit elements, the plate load resistances 232 and 233, the coupling capacitance 234, and the common cathode resistance 231. The output of this two-stage amplifier is derived at the plate of the stage V5 and is applied to the control grid of the stage V6 of the adder by way of the coupling capacitor 236. This output has the wave form shown in Fig. 4B. The tubes V6 and V7 together comprise the adder. Actually, because of the additional 180-degree phase shift introduced by the extra or third stage of amplification for the signal input applied to the equalizing circuit, the equalizing pulses derived at the output of tube V3 and the filtered wave derived as the output of tube V5 are 180 degrees out of phase, so that to obtain addition as shown in Fig. 4D, it is necessary to subtract the output of stage V3 from the output of stage V5. To this end, the tubes V6 and V7 form a differential amplifier which acts to provide an output which is the arithmetic difference of the signals applied to its two control grids. To obtain this differential action, the cathodes of tubes V6 and V7 are coupled together and connected through the common resistance $R_c$ to the negative terminal of the potential source or battery 300, and the value of $R_c$ is chosen so that $$R_c >> \frac{1}{g_m}$$

where $g_m$ is the transconductance of each of the tubes V6 and V7. The resultant is derived across the resistance 238 which forms the plate load of the tube V6. This resultant which has the wave form shown in Fig. 4E is applied by way of the coupling capacitance 240 to the control grid of the stage V8 for clipping. Clipping action is achieved there by connecting this control grid through the resistance 242 to the negative grid of the potential source or battery 310, the positive terminal of which is grounded. The value of this potential is chosen to provide a negative bias on the grid of the tube V8 which will provide a clipping level of sufficient amplitude to suppress all but the peaks of the positive pulses produced by the superposition of the equalized pulses on the filtered wave, as is shown in Fig. 4D. Then, by operating tube V8 as a conventional amplifying stage, there can be derived output pulses of the kind shown in Fig. 4E. As has been mentioned above, these may be used directly in some cases to control the sweep generator. However, in the circuit shown here, the tube V8 is operated as a pulse stretcher. The cathode of tube V8 is connected to ground through resistance 243, and the plate voltage is applied by way of resistance 244 from the potential source 250. In these respects, tube V8 is operated as a conventional amplifier. Additionally, the capacitance 245 is connected between the ungrounded output terminal 247 and the plate of tube V8, and the high resistance 246 is connected between the two output terminals 247 and 248. Pulse stretching is accomplished by charging the stray capacitance $C_s$ across the output terminals through tube V8 and by making the discharge path of this stray capacitance the high resistance 246. There is then derived across the output terminals a signal having the wave form shown in Fig. 4F. This signal can be used to synchronize the conventional vertical sweep generator in the conventional television monitor or receiver.

It is to be understood that this particular circuit arrangement is merely illustrative of the general principles of the invention. Various other amplifying differentiating, clipping and adding circuit arrangements known to the art can be utilized in the construction of a vertical synchronizing separator within the scope of the present invention.

What is claimed is:

1. A synchronizing separator system comprising an input source of composite synchronizing signals including a first series of pulses of a first recurrent frequency and a second series of longer serrated pulses of a lower recurrent frequency, low-pass filter means supplied with said composite signal having an upper cut-off frequency below said first recurrent frequency and above said second recurrent frequency for providing a first output, means also supplied with said composite synchronizing signal responsive to leading edges of the pulses of said composite signal for providing a second output, means for combining said first and second outputs into a combined output, means for clipping said combined output at a level greater than the maximum amplitude level of either said first or second outputs, and means for utilizing the output of said clipping means.

2. A vertical sweep separator for a television system comprising an input source of composite synchronizing signals including horizontal synchronizing pulses at a line recurrent rate, and vertical synchronizing pulses at a field recurrent rate, low-pass filter means having an upper cut-off below the line recurrent frequency and above the field recurrent frequency supplied with said composite signal for deriving a first output, means responsive to leading pulse edges supplied with said composite signal for deriving a second output, means for combining said first and second outputs into a combined output, means for clipping said combined output at a level greater than the maximum amplitude of either the first or second outputs, and means for utilizing the output of said clipping means for vertical synchronization.

3. A vertical synchronization circuit for a television receiver comprising an input source of a composite synchronizing signal having horizontal synchronizing pulses of line recurrent frequency and vertical synchronizing pulses of field recurrent frequency, low-pass filter means having an upper cut-off frequency below the line recurrent frequency and above the field recurrent frequency supplied with said composite signal for providing a first output, differentiating means supplied with said composite signal for providing a series of pulses, each pulse being coincident with a leading edge of said composite signal, means for combining said first output and the last-mentioned series of pulses and deriving a combined output, means for clipping said combined output at a level greater than the maximum amplitude of said first output or said last-mentioned series of pulses, and means for utilizing the output of said clipping means for vertical synchronization.

4. A vertical synchronization circuit for a television receiver comprising an input source of a composite synchronizing signal having horizontal synchronizing pulses of line recurrent frequency and vertical synchronizing pulses of field recurrent frequency, low-pass filter means having an upper cut-off frequency below the line recurrent frequency and above the field recurrent frequency supplied with said composite signal for providing a first output, equalizing means including a short-circuited delay line supplied with said composite signal for deriving a series of pulses coincident with leading edges of said composite signal, means for combining the first output and the last-mentioned series of pulses and obtaining a combined output, means for clipping said combined output at a level greater than the maximum amplitude of either said first output or said last-mentioned series of pulses, and means for utilizing the output of said clipping means for vertical synchronization.

5. In a synchronizing signal separator system, an input source of composite synchronizing signals, said signals including one series of pulses at a first recurrent frequency and a second series of longer serrated pulses at a second recurrent frequency, low-pass filter means supplied with said composite signals having its cut-off frequency lying above said second recurrent frequency and below said first recurrent frequency, combining means having a first and a second input circuit, means for applying the output of said low-pass filter means to said first input circuit, means for connecting said input source to said second input circuit, and clipping means supplied with the output of said combining means.

CHARLES W. HARRISON.

References Cited in the file of this patent

UNITED STATES PATENTS

| Number | Name | Date |
|---|---|---|
| 2,292,148 | Moe | Aug. 4, 1942 |
| 2,511,146 | Beste | June 13, 1950 |
| 2,521,504 | Dome | Sept. 5, 1950 |